3,240,707
CORROSION INHIBITOR COMPOSITIONS FOR
AQUEOUS LIQUIDS
Joseph Dulat, Surbiton, England, assignor to United States Borax and Chemical Corporation, Los Angeles, Calif.
No Drawing. Filed May 11, 1961, Ser. No. 109,264
Claims priority, application Great Britain, June 21, 1960, 21,789/60
12 Claims. (Cl. 252—75)

This invention relates as indicated to corrosion inhibitor compositions for aqueous liquids, particularly aqueous coolants for internal combustion engines, and the production of such compositions.

Despite the wealth of research in the field of reducing the corrosion of metals by aqueous liquids, especially aqueous liquids comprising a polyhydric alcohol, e.g., ethylene, propylene or hexylene glycol, which are much used as antifreeze agents for internal combustion engine coolants, the discovery of an effective and cheap inhibitor has proved an elusive goal.

It is therefore the principal object of the present invention to provide corrosion inhibitor compositions which are effective and economically desirable.

It is a further object of this invention to provide antifreeze agents for internal combustion engines having outstanding corrosion inhibition characteristics and which are cheap.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises corrision inhibitor compositions for aqueous liquids comprising in combination an alkali metal borate, an alkali metal silicate, a material selected from the group consisting of mercaptobenzothiazole and alkali metal salts of mercaptobenzothiazole, and at least one material selected from the group consisting of alkali metal aluminates, inorganic alkaline earth metal salts and alkaline earth metal oxides.

The present invention is based on the discovery that the usefulness of a mixture of a source of borate ions such as borax, mercaptobenzothiazole or a water soluble salt thereof, such as an alkali metal mercaptobenzothiazole salt, and a water soluble silicate, such as sodium meta- and other silicate, which is an effective and cheap inhibitor composition for aqueous liquids and has a particularly useful effect in reducing the corrosion of aluminum and ferrous metals by such liquids, is enhanced by the presence of a source of alkaline earth metal ions, especially calcium ions, or a water-soluble aluminate, or both.

According to a feature of the present invention, there is provided a corrosion inhibitor composition for aqueous liquids comprising, as corrosion inhibitors, a source of borate ions, a water soluble silicate, and mercaptobenzothiazole or a water soluble salt thereof, and additionally a source of alkaline earth metal ions or water soluble aluminate or both. The components must, of course, not provide ions which are corrosive or which counteract the beneficial properties of the essential components. The source of borate ions can be any alkali metal borate, preferably a sodium borate, such as borax; and the silicate can be any alkali metal silicate, preferably sodium metasilicate or other sodium silicate. The source of alkaline earth metal ions is any inorganic alkaline earth metal salt or oxide and is preferably a calcium compound, such as calcium oxide. The aluminate can be any alkali metal aluminate, preferably sodium aluminate.

The individual components of the compositions are preferably proportioned by weight in the ratio: borate (calculated as $B_2O_3$):mercaptobenzothiazole or salt thereof:silicate:source of alkali metal ions and/or aluminate=10–30:0.5–5:0.5–5:0.1–2, and the composition will contain sufficient alkaline material so that when made up for use as a coolant, the coolant has a pH in the range effective for inhibiting corrosion. Generally, this range is between 7 and 10 for diluted solutions containing 25% by volume of a polyhydric alcohol. By way of example, for an ethylene glycol based antifreeze composition diluted with water to give a 25% v./v. solution of ethylene glycol the pH range is 7.8 to 8.2 (British Standard 3152 (1959)).

One form of composition according to the invention comprises the mixture of corrosion inhibitors described above in solution, suspension, or both, in a water miscible organic liquid. The liqud may, in accordance with a preferred feature of the invention, be an antifreeze agent, which will normally be a polyhydric alcohol, and will preferably contain 2.5 to 7.5% by weight of the mixture of corrosion inhibitors. On simple dilution with water these compositions yield a coolant which has a freezing point below 0° C., the actual freezing point being determined (as with conventional antifreeze compositions) by the degree of dilution.

The inhibitor mixture can be used for inhibiting coolants which contain either no polyhydric alcohol or insufficient polyhydric alcohol to act effectively as an antifreeze agent. For producing these coolants (herein called "summer coolants"), the inhibitor composition generally comprises a water miscible organic liquid, advantageously a polyhydric alcohol, e.g., ethylene glycol, glycerol or a mixture thereof, and also in solution, suspension or both the mixture of corrosion inhibitors described above, usually in amount 15–30% by weight. These solutions or suspensions are prepared for use by simple dilution with water, and the diluted composition will normally contain ½ to 2½%, preferably 1%, by weight of the corrosion inhibitor mixture. Alternatively, such summer coolants may be prepared by simply dissolving a solid mixture of the corrosion inhibitors in water.

Another form of corrosion inhibitor composition according to the invention comprises a solid mixture of the corrosion inhibitors. Such a mixture can be dissolved in the antifreeze agent, or if a coolant without antifreeze properties is required, it can be dissolved in a water miscible organic liquid or in water alone as discussed above. Such solid mixtures are preferably produced in the form of granules comprising a non-segregating mixture of all the components of the composition.

According to a further feature of the invention there is provided a process for producing a granular inhibitor composition which comprises the step of mixing an aqueous solution of a water soluble silicate, preferably at or near room temperature, with a granular water-deficient (as hereinafter defined) water soluble borate, mercaptobenzothiazole or a water soluble salt thereof and, if desired, a source of alkaline earth metal ions or a water soluble aluminate or both, being in admixture with the granular borate or the silicate solution or both, and the amount of water in the silicate solution being not substantially more than is required to satisfy the water deficiency of the borate. Preferably, the silicate solution is added to an antimate mixture of the borate, the mercaptobenzothiazole or salt thereof and the source of alkaline earth metal ions and aluminate is used. If the mixing is not sufficiently vigorous, it may be necessary to spray the silicate solution in finely atomized form onto the borate. By "granular water-deficient borate" is meant a granular non-deliquescent crystalline borate carrying less than its maximum amount of water of crystallization and capable at atmospheric temperatures of fairly rapidly absorbing, and holding, water as water of crystallization so as to supply all or part of the water deficiency. In speaking of fairly rapid absorption of water, the rate at which sodium tetraborate pentahydrate absorbs water at ordinary temperatures may be taken as typical. Preferably the water-deficient borate is sodium tetraborate pentahydrate and the amount of water employed is 1 to 2 moles of water per mole of the borate, preferably 1 or slightly more than 1.

The invention is illustrated in the following examples:

EXAMPLE I

The following glycol solutions were prepared:

(1)

| | Percent w./w. |
|---|---|
| Borax ($Na_2B_4O_7 \cdot 10H_2O$) | 3.0 |
| Mercaptobenzothiazole ($C_7H_5NS_2$) | 0.1 |
| Sodium metasilicate ($Na_2SiO_3 \cdot 5H_2O$) | 0.1 |
| Calcium oxide | 0.03 |
| Ethylene glycol | To 100 |

(2)

| | |
|---|---|
| Borax | 3.0 |
| Mercaptobenzothiazole | 0.1 |
| Sodium metasilicate | 0.1 |
| Sodium aluminate ($NaAlO_2$) | 0.03 |
| Ethylene glycol | To 100 |

(3)

| | |
|---|---|
| Borax | 3.0 |
| Mercaptobenzothiazole | 0.1 |
| Sodium metasilicate | 0.1 |
| Calcium oxide | 0.03 |
| Sodium aluminate | 0.03 |
| Ethylene glycol | To 100 |

The method of preparation was as follows: The borax, mercaptobenzothiazole and calcium oxide were warmed with the appropriate quantity of ethylene glycol (complying with BS 2537) and the sodium aluminate and sodium metasilicate added as 3% and 10% aqueous solutions, respectively. Thus, for each 100 g. of inhibited antifreeze 1 ml. of either aluminate or silicate concentrate was required. Samples of the inhibited ethylene glycol were diluted for use in comparative corrosion tests with two volumes of tap water (30 p.p.m. NaCl).

The corrosion tests were carried out by the method recommended by the American Society for Testing Materials (ASTM designation D1384–55T) modified as follows:

(1) The duration of the test was two months instead of 14 days.
(2) The movement of liquid past the metal surfaces was effected by rotating the corrosion specimens at 60 r.p.m.
(3) The test solutions were heated only for eight hours a day and were allowed to cool to room temperature overnight.
(4) In preparing specimens the unspecified scouring powder was replaced by emery cloth complying with British Standard 871: 1939.
(5) The cleaning of specimens on completion of test was carried out by chemical or electrochemical methods extensively tested to ensure that the removal of uncorroded metal is small compared with the weight of corrosion product removed.
(6) The artificial and excessive aeration in the ASTM test was replaced by "natural" aeration by allowing a free passage of air out and into the beaker; on heating some of the air was expelled and on cooling fresh air was forced in due to the contraction of the volume of the liquid.
(7) The choice of metals and the order in which they were assembled was as recommended by the Society of Automotive Engineers in SAE Handbook, 1955.

The tests were carried out on a set of six specimens, each set comprising one specimen of each of the metals tested in electrical contact. Each specimen had a surface area of 33 sq. cm. The test solution was 33% (v./v.) ethylene glycol in tap water containing 30 p.p.m. chloride (NaCl). Solutions were at 80±5° C. during working hours and allowed to cool to room temperature overnight.

The results of the test are summarized in Table I below:

*Table I*

| Composition No. | Composition | Corrosion Weight Loss in mg./specimen | | | | | |
|---|---|---|---|---|---|---|---|
| | | Tinned Iron | Mild Steel | Aluminum | Cast Iron | Brass | Copper |
| 1 | Antifreeze Brand A [British Standard DTD 779 (1951)] | 75.3 | 65.9 | 0.0 | 84.5 | 1.9 | 2.3 |
| 2 | Antifreeze Brand B (borate inhibitor) | 23.9 | 0.5 | 25.3(P) | 0.5 | 3.1 | 15.6 |
| 3 | 3% Borax (control) | 19.9 | 1.0 | 34.2(P) | 0.6 | 4.3 | 7.6 |
| 4 | 3% Borax, 0.1% MBT, 0.1% silicate | 1.6 | 3.5 | 1.4(SP) | 4.3 | 0.9 | 0.1 |
| 5 | Example I, 1 | 0.7 | 0.3 | 0.6(TP) | 0.0 | 0.6 | 0.0 |
| 6 | Example I, 2 | 0.6 | 1.7 | 8.7(U) | 1.1 | 1.0 | 0.0 |
| 7 | Example I, 3 | 0.9 | 0.8 | 9.0(U) | 0.8 | 1.0 | 0.5 |

All concentrations are by weight of ethylene glycol.
The symbols have the following meanings: MBT=mercaptobenzothiazole; P=pitting; TP=trace (insignificant) pitting; SP=slight pitting; U=uniform corrosion.

It is apparent from the results that the corrosion inhibitors of the present invention are highly superior to the prior art compositions. Attention is directed to the fact that the present compositions, 5, 6 and 7, are the only ones which can be used with any and all of the metals tested. Referring first to antifreeze brand "A," composition No. 1, it will be seen that while it has no corrosive effect on aluminum when tested on the ferrous metals, the results are extremely detrimental, with lesser but nonetheless positive weight losses with brass and copper. Antifreeze brand "B," compositions No. 2, has little effect on mild steel and cast iron, but when tested on tinned iron, aluminum and copper, the results are substantially as bad as antifreeze brand "A," again with lesser but still negative results on brass. Composition No. 3 comprises the control and, as noted above, consisted of 3% borax in ethylene glycol, the use of which gave results substantially the same as those obtained with antifreeze brand "B." Composition No. 4 comprises an inhibitor composition commonly used in antifreeze formulations in both the United States and the United Kingdom. It will be seen that compositions 5, 6 and 7 afford better protection in respect of the ferrous metals than does composition No. 4, and composition No. 5 affords better protection in respect of all the metals tested than does composition No. 4. Referring now to compositions Nos. 6 and 7, attention is specifically directed to the fact that the corrosion of the aluminum was uniform with no formation of pits as produced with compositions Nos. 2, 3 and 4. The corrosion weight loss figures for aluminum for compositions Nos. 6 and 7 are not considered to be disadvantageous due to the fact that the corrosion product provided a uniform, smooth and strongly adherent film which conferred protection to the underlying metal against further corrosion.

EXAMPLE II

This example illustrates the production by the process of the invention of a granular inhibitor composition. The ingredients used were:

| | Parts by weight |
|---|---|
| Sodium tetraborate pentahydrate | 115 |
| Mercaptobenzothiazole | 5 |
| Sodium metasilicate ($Na_2SiO_3 \cdot 5H_2O$) | 3 |
| Calcium oxide | 1.5 |
| Water | 16 |

The borate, mercaptobenzothiazole and calcium oxide were intimately mixed and to this mixture was slowly added a solution of the silicate in the water. The mixture was manually mixed to give a damp homogeneous mixture, which when thinly spread, dried in about 15 minutes in air, giving a slightly caked mass which crumbled at a touch to small granules.

Repeating this procedure using a concrete-mixer-type mixing device and employing only half the amount of water gave satisfactory results after one hour's mixing provided the silicate solution was sprayed into the falling powder in a finely atomized state. A dye, e.g., Rhodamine 500, can be included in the dry mix if a coloured antifreeze composition is required.

EXAMPLE III

This example illustrates a summer coolant composition according to the invention.

The granular inhibitor composition described in Example II was made up to a 1% aqueous solution by (i) dissolving the granular inhibitor in tap water alone to provide a 1% solution (Summer Coolant 1), and (ii) forming a concentrate comprising 24% of the granular inhibitor in a 1:1 mixture of ethylene glycol and glycerol, and then diluting with the required volume of tap water (Summer Coolant 2).

Corrosion tests were carried out on the above Summer Coolants by the procedure described in Example I. The results are as follows:

2.5 to about 7.5% by weight based on said alcohol of a corrosion inhibitor, said corrosion inhibitor consisting essentially of an admixture of sodium borate, a material selected from the group consisting of mercaptobenzothiazole and alkali metal salts of mercaptobenzothiazole, sodium silicate and at least one material selected from the group consisting of calcium oxide and sodium aluminate, the inhibitor ingredients present by weight in the ratios of 10 to 30:0.5 to 5:0.5 to 5:0.1 to 2, respectively, and said sodium borate being calculated as $B_2O_3$.

2. A coolant composition for internal combustion engines consisting essentially of at least one water miscible polyhydric alcohol antifreeze agent and from about 15 to about 30% by weight based on said alcohol of a corrosion inhibitor, said corrosion inhibitor consisting essentially of an admixture of sodium borate, a material selected from the group consisting of mercaptobenzothiazole, and alkali metal salts of mercaptobenzothiazole, sodium silicate and at least one material selected from the group consisting of calcium oxide and sodium aluminate, the inhibitor ingredients present by weight in the ratios of 10 to 30:0.5 to 5:0.5 to 5:0.1 to 2, respectively, and said sodium borate being calculated as $B_2O_3$.

3. An antifreeze composition for internal combustion engines consisting essentially of:

| | Percent w./w. |
|---|---|
| Borax | 3.0 |
| Mercaptobenzothiazole | 0.1 |
| Sodium metasilicate | 0.1 |
| Calcium oxide | 0.03 |
| Ethylene glycol | to 100 |

4. An antifreeze composition for internal combustion engines consisting essentially of:

| | Percent w./w. |
|---|---|
| Borax | 3.0 |
| Mercaptobenzothiazole | 0.1 |
| Sodium metasilicate | 0.1 |
| Sodium aluminate | 0.03 |
| Ethylene glycol | to 100 |

5. An antifreeze composition for internal combustion engines consisting essentially of:

| | Percent w./w. |
|---|---|
| Borax | 3.0 |
| Mercaptobenzothiazole | 0.1 |
| Sodium metasilicate | 0.1 |
| Calcium oxide | 0.03 |
| Sodium aluminate | 0.03 |
| Ethylene glycol | to 100 |

6. Corrosion inhibitor composition for aqueous liquids having a pH of at least about 7, consisting essentially of an admixture of sodium borate, a material selected from the class consisting of mercaptobenzothiazole and alkali metal salts of mercaptobenzothiazole, sodium

| Composition | Corrosion weight loss, mg./specimen | | | | | | Weight loss, mg./set of specimens |
|---|---|---|---|---|---|---|---|
| | Tinned Iron | Mild Steel | Aluminum- | Cast Iron | Brass | Copper | |
| Summer Coolant 1 | 0.2 | 0.4 | 7.6 | 0.0 | 0.6 | 0.1 | 8.9 |
| Summer Coolant 2 | 0.2 | 0.1 | 2.8 | 0.0 | 0.6 | 0.3 | 4.0 |

(These figures are many times smaller than those obtained from tap water from which the inhibitor mixture has been omitted.)

Other modes of applying the principle of the invention may be employed, change being made as regards the details described, provided the features stated in any of the following claims or the equivalent of such be employed.

I, therefore, particularly point out and distinctly claim as my invention:

1. An antifreeze composition for internal combustion engines consisting essentially of at least one water miscible polyhydric alcohol antifreeze agent, and from about silicate and at least one material selected from the group consisting of calcium oxide and sodium aluminate, the ingredients being present by weight in the ratios 10 to 30:0.5 to 5:0.5 to 0:0.1 to 2, respectively, and said sodium borate being calculated as $B_2O_3$.

7. A corrosion inhibitor composition for aqueous liquids having a pH of at least about 7, consisting essentially of an admixture of sodium borate, mercaptobenzothiazole, sodium silicate, and about equal parts by weight of calcium oxide and sodium aluminate, where the ingredients alkali metal borate:mercaptobenzothiazole:sodium silicate:calcium oxide plus sodium aluminate are present by weight in the ratios 10 to 30:0.5 to 5:0.5 to 5:0.1 to 2, respectively, and said sodium borate being calculated as $B_2O_3$.

8. A corrosion inhibitor composition for aqueous liquids having a pH of at least about 7, consisting essentially of sodium borate, mercaptobenzothiazole, sodium silicate and calcium oxide, the ingredients being present by weight in the rations 10 to 30:0.5 to 5:0.5 to 5:0.1 to 2, respectively, and said sodium borate being calculated as $B_2O_3$.

9. A corrosion inhibitor composition for aqueous liquids having a pH of at least about 7, consisting essentially of sodium borate, mercaptobenzothiazole, sodium silicate and an alkali metal aluminate, the ingredients being present by weight in the ratios 10 to 30:0.5 to 5:0.5 to 5:0.1 to 2, respectively, and said sodium borate being calculated as $B_2O_3$.

10. A corrosion inhibitor composition for aqueous liquids having a pH of at least about 7, consisting essentially of borax, mercaptobenzothiazole, sodium metasilicate, and about equal parts by weight of calcium oxide plus sodium aluminate, present by weight in the ratios 10 to 30:0.5 to 5:0.5 to 5:0.1 to 2, respectively, and said borax being calculated as $B_2O_3$.

11. A corrosion inhibitor composition for aqueous liquids having a pH of at least about 7, consisting essentially of borax, mercaptobenzothiazole, sodium metasilicate and calcium oxide present by weight in the ratios 10 to 30:0.5 to 5:0.5 to 5:0.1 to 2, respectively, and said borax being calculated as $B_2O_3$.

12. A corrosion inhibitor composition for aqueous liquids having a pH of at least about 7, consisting essentially of borax, mercaptobenzothiazole, sodium metasilicate and sodium aluminate being present by weight in the ratios 10 to 30:0.5 to 5:0.5 to 5:0.1 to 2, respectively, and said borax being calculated as $B_2O_3$.

References Cited by the Examiner
UNITED STATES PATENTS

| | | | |
|---|---|---|---|
| 2,264,389 | 12/1941 | Lamprey | 252—75 XR |
| 2,462,694 | 2/1949 | Walker | 252—75 |
| 2,575,576 | 11/1951 | Bacon et al. | 252—138 |
| 2,765,278 | 10/1956 | Holter et al. | 252—75 |
| 2,803,603 | 8/1957 | Meighen | 252—75 |
| 2,834,735 | 5/1958 | Woodle et al. | 252—74 |
| 2,972,581 | 2/1961 | Johnson et al. | 252—75 |
| 3,015,629 | 1/1962 | Truitt | 252—75 |
| 3,046,229 | 7/1962 | Cessna et al. | 252—74 |

JULIUS GREENWALD, *Primary Examiner.*